United States Patent
Seo et al.

(10) Patent No.: US 11,283,113 B2
(45) Date of Patent: Mar. 22, 2022

(54) VEHICULAR BATTERY COOLING SYSTEM AND METHOD FOR CONTROLLING THE SAME

(71) Applicants: HYUNDAI MOTOR COMPANY, Seoul (KR); KIA MOTORS CORPORATION, Seoul (KR)

(72) Inventors: Jeong Hun Seo, Suwon-si (KR); Jun Seok Choi, Suwon-si (KR); Yong Jae Kim, Suwon-si (KR); Hui Tae Yang, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 711 days.

(21) Appl. No.: 16/001,249

(22) Filed: Jun. 6, 2018

(65) Prior Publication Data
US 2019/0173136 A1 Jun. 6, 2019

(30) Foreign Application Priority Data
Dec. 5, 2017 (KR) .................. 10-2017-0166118

(51) Int. Cl.
| | | |
|---|---|---|
| *H01M 10/44* | (2006.01) | |
| *H01M 10/48* | (2006.01) | |
| *H01M 10/613* | (2014.01) | |
| *H01M 10/625* | (2014.01) | |
| *H01M 10/655* | (2014.01) | |

(Continued)

(52) U.S. Cl.
CPC ......... *H01M 10/443* (2013.01); *B60L 3/0046* (2013.01); *B60L 58/25* (2019.02); *B60L 58/26* (2019.02); *H01M 10/441* (2013.01); *H01M 10/482* (2013.01); *H01M 10/486* (2013.01); *H01M 10/613* (2015.04); *H01M 10/625* (2015.04); *H01M 10/655* (2015.04); *H01M 50/20* (2021.01); *B60L 2240/36* (2013.01); *B60L 2240/545* (2013.01); *B60L 2240/60* (2013.01); *B60L 2240/80* (2013.01); *B60L 2260/44* (2013.01); *B60L 2260/50* (2013.01); *H01M 2220/20* (2013.01); *H02J 7/0063* (2013.01); *H02J 2007/0067* (2013.01)

(58) Field of Classification Search
CPC .... H01M 10/44; H01M 10/48; H01M 10/613; H01M 10/625; H01M 10/655; H01M 2/10; H02J 7/00
USPC ........................................ 307/10.7, 9.1, 10.1
See application file for complete search history.

(56) References Cited

U.S. PATENT DOCUMENTS

| | | | | |
|---|---|---|---|---|
| 2011/0305935 | A1* | 12/2011 | Yoon .................. | H01M 10/6554 429/120 |
| 2016/0200216 | A1* | 7/2016 | Fultz ...................... | B60L 58/12 320/136 |
| 2018/0304765 | A1* | 10/2018 | Newman ................. | B60L 58/26 |

FOREIGN PATENT DOCUMENTS

| | | | |
|---|---|---|---|
| JP | 2012044813 | * | 3/2012 |
| JP | 2015033154 | * | 2/2015 |
| KR | 10-2012-0133872 A | | 12/2012 |

* cited by examiner

Primary Examiner — Toan T Vu
Assistant Examiner — Xuan Ly
(74) Attorney, Agent, or Firm — Mintz Levin Cohn Ferris Glovsky and Popeo, P.C.; Peter F. Corless

(57) ABSTRACT

Disclosed is a cooling system for a battery of a vehicle and a method for cooling the battery. A heat absorption member is attached to a terminal of battery cell of the battery for absorbing heat. A controller of the vehicle computes heat (Continued)

generation based on the driver's input about the vehicle's destination, controls the battery to limit its current output after temperature.

11 Claims, 5 Drawing Sheets

(51) Int. Cl.
*H01M 2/10* (2006.01)
*H02J 7/00* (2006.01)
*B60L 58/25* (2019.01)
*B60L 58/26* (2019.01)
*B60L 3/00* (2019.01)
*H01M 50/20* (2021.01)

VEHICULAR BATTERY COOLING SYSTEM AND METHOD FOR CONTROLLING THE SAME

CROSS REFERENCE TO RELATED APPLICATION

The present application claims priority to Korean Patent Application No. 10-2017-0166118 filed Dec. 5, 2017, the entire contents of which is incorporated herein for all purposes by this reference.

BACKGROUND

1. Technical Field

The present disclosure relates to a vehicular battery cooling system and a method of controlling the same, and more particularly, to a vehicular battery cooling system and a method of controlling the same for intelligently controlling a current usage using a heat absorption member of a battery terminal and driving data on an actual road.

2. Description of Related Art

Differently from plug-in hybrid electric vehicles (PHEVs) and electric vehicles (EVs), a battery system of a current hybrid electric vehicle (HEV) applies a high power system and there is a problem in that a volume of the battery system is increased to apply the high power system.

Accordingly, there is a need for a method of minimizing a space occupied by a battery system in a vehicle to minimize a volume of the battery system, to miniaturize a cooling system, and to enhance cooling efficiency, ensuring equivalent productivity of a basic vehicle.

The disclosure of this section is to provide background of the invention. Applicant notes that this section may contain information available before this application. However, by providing this section, Applicant does not admit that any information contained in this section constitutes prior art.

SUMMARY

An aspect of the present disclosure is to provide a vehicular battery cooling system and a method of controlling the same for intelligently controlling a current usage using a heat absorption member of a battery terminal and driving data on an actual road.

When a battery system uses an active cooling method, a flow channel is provided between battery cells and, a space for the flow channel (gap) needs to be ensured, and accordingly volume of the battery cell package is increased due to the flow channel.

When a cooling duct is provide to use air from a vehicle cabin, there is a problem in terms of degraded cooling performance.

In addition, when a cooling fan is applied for cooling the battery package, there is problem in that noise of the cooling fan is introduced indoors.

According to an embodiment of the present disclosure, a vehicular battery cooling system includes a plurality of stacked battery cells, a heat absorption member disposed between terminals of the battery cells, a navigation device configured to receive a destination from a user to derive a driving time period, and a controller configured to derive a battery heating value from the derived driving time period and to limit a battery current usage based on a comparison result between the derived battery heating value and a pre-stored heat absorption available amount of the heat absorption member when a destination is input to the navigation device prior to vehicle driving.

The controller may derive a battery over temperature ratio based on a heat absorption excess when the derived battery heating value is greater than the pre-stored heat absorption available amount of the heat absorption member and limit the battery current usage based on pre-stored driving characteristics of a driver when the derived battery over temperature ratio is greater than a predetermined value.

According to another embodiment of the present disclosure, a vehicular battery cooling system includes a plurality of stacked battery cells, a heat absorption member disposed between terminals of the battery cells, and a controller configured to monitor a battery accumulated current usage, a heating value, and an over temperature ratio during vehicle driving and to limit the battery current usage based on a comparison result between the monitored battery heating value and a pre-stored heat absorption available amount of the heat absorption member.

The controller may compare the monitored battery over temperature ratio with a predetermined value when the monitored battery heating value is greater than the pre-stored heat absorption available amount of the heat absorption member and limit the battery current usage based on pre-stored driving characteristics of the driver when the battery over temperature ratio is greater than the predetermined value as a comparison result.

According to another embodiment of the present disclosure, a method of controlling a vehicular battery cooling system including a heat absorption member disposed between terminals of a plurality of stacked battery cells includes determining whether a destination is input to a navigation device from a user prior to vehicle driving, when the destination is input, deriving a battery heating value from a driving time period derived via input of the destination, and limiting a battery current usage based on a comparison result between the derived battery heating value and a pre-stored heat absorption available amount of the heat absorption member.

The determining of whether the destination is input may include deriving a battery heating value based on an accumulated current usage depending on a pre-stored driving time period of a user when the destination is not input.

The limiting of the battery current usage may include, when the derived battery heating value is greater than the pre-stored heat absorption available amount of the heat absorption member, deriving a battery over temperature ratio based on a heat absorption excess, and when the derived battery over temperature ratio is greater than a predetermined value, limiting a battery current usage based on pre-stored driving characteristics of a driver.

The limiting of the battery current usage based on the pre-stored driving characteristics of the driver may include limiting the battery current usage to be less than a first limit when the pre-stored driving characteristics of the driver are first characteristics and limiting the battery current usage to be less than a second limit when the pre-stored driving characteristics of the driver are second characteristics.

According to another embodiment of the present disclosure, a method of controlling a vehicular battery cooling system including a heat absorption member disposed between terminals of a plurality of stacked battery cells includes monitoring a battery accumulated current usage, a heating value, and an over temperature ratio during vehicle driving, and limiting a battery current usage based on a comparison result between the monitored battery heating value and a pre-stored heat absorption available amount of the heat absorption member.

The limiting of the battery current usage may include, when the monitored battery heating value is greater than the pre-stored heat absorption available amount of the heat absorption member, comparing the monitored battery over temperature ratio with a predetermined value and, as a comparison result, when the battery over temperature ratio is greater than the predetermined value, limiting the battery current usage based on pre-stored driving characteristics of a driver.

The limiting of the battery current usage based on the pre-stored driving characteristics of the driver may include limiting the battery current usage to be less than a first limit when the pre-stored driving characteristics of the driver is first characteristics and limiting the battery current usage to be less than a second limit when the pre-stored driving characteristics of the driver is second characteristics.

DETAILED DESCRIPTION OF EMBODIMENTS

Figure 1:
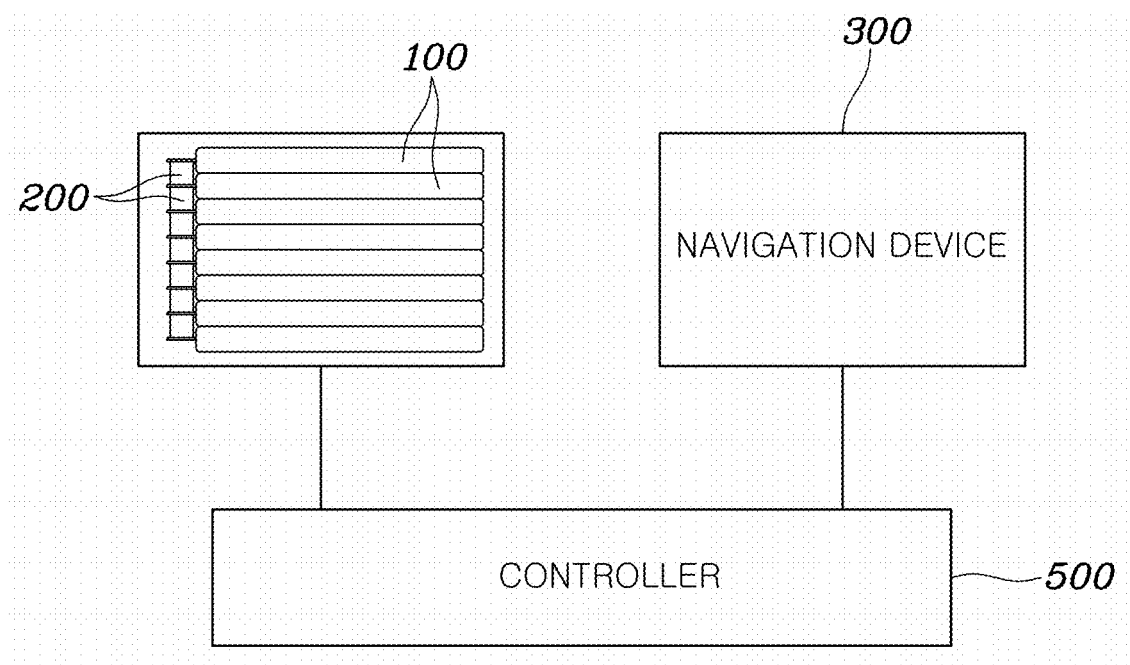
FIG. 1 is a diagram showing a configuration of a vehicular battery cooling system according to an embodiment of the present disclosure.

Hereinafter, a vehicular battery cooling system and a method of controlling the same according to various embodiments of the present disclosure is described with reference to the accompanying drawings.

In a hybrid vehicle, a battery package (100, 200 combined) provides power to a wheel driving motor of the vehicle. The battery package includes a plurality of battery cells.

In embodiments, the plurality of battery cells 100 are stacked with no gap (or no channel for cooling air) between two immediately neighboring cells because the battery package is not cooled using an active cooling system (like cooling fans) to blow air for cooling the battery. Rather, a plurality of heat absorption members 200 are attached to the terminal of the battery cells to absorbs heat from the battery cell 100. In embodiments, the battery cells 100 and the heat absorption member 200 are contained in an housing (airtight) to form a battery package, and the housing does not have an inlet for a coolant (air, liquid).

In embodiments, a controller controls current output from the battery. The controller computes heat generation from the battery to drive along a route (from the current location to a destination inputted using a navigation system). In embodiments, while driving along the route, the controller monitors status (temperature) of the battery cells or the heat absorption member and updates expected heat generation to arrive the destination. Then, the controller limits current output from the battery when it is determined that the updated estimate of heat generation exceeds a predetermined heat capacity of the heat absorption members even when state of charge (SOC) of the battery is enough to drive the vehicle to the destination. As such, the controller prevents overheating of the battery cell in a passive way without using an active cooling system like a cooling fan and an air duct for circulate air for cooling the battery.

Figure 2:
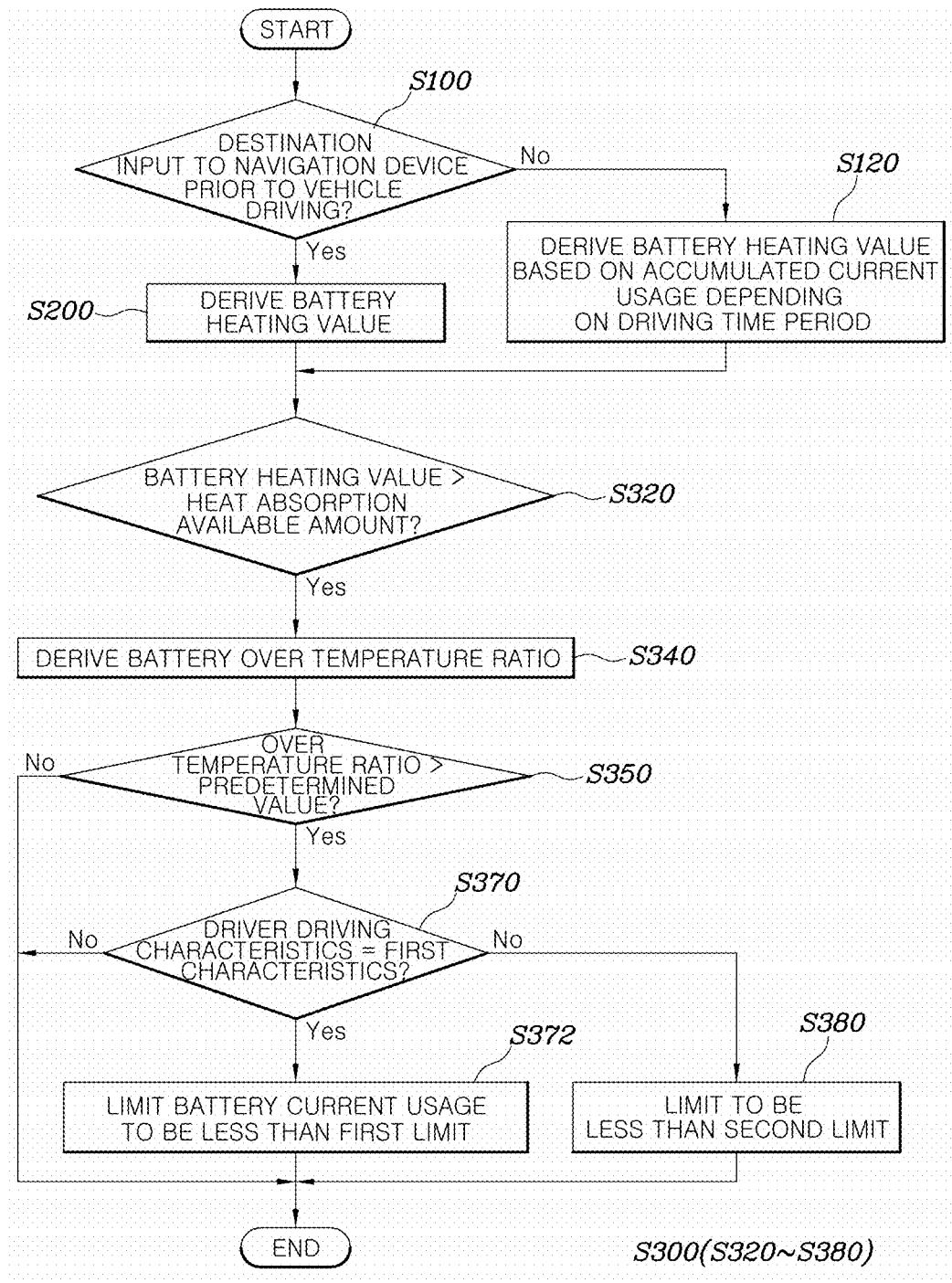
FIG. 2 is a flowchart 1 of a method of controlling a vehicular battery cooling system according to an embodiment of the present disclosure.
Figure 3A:
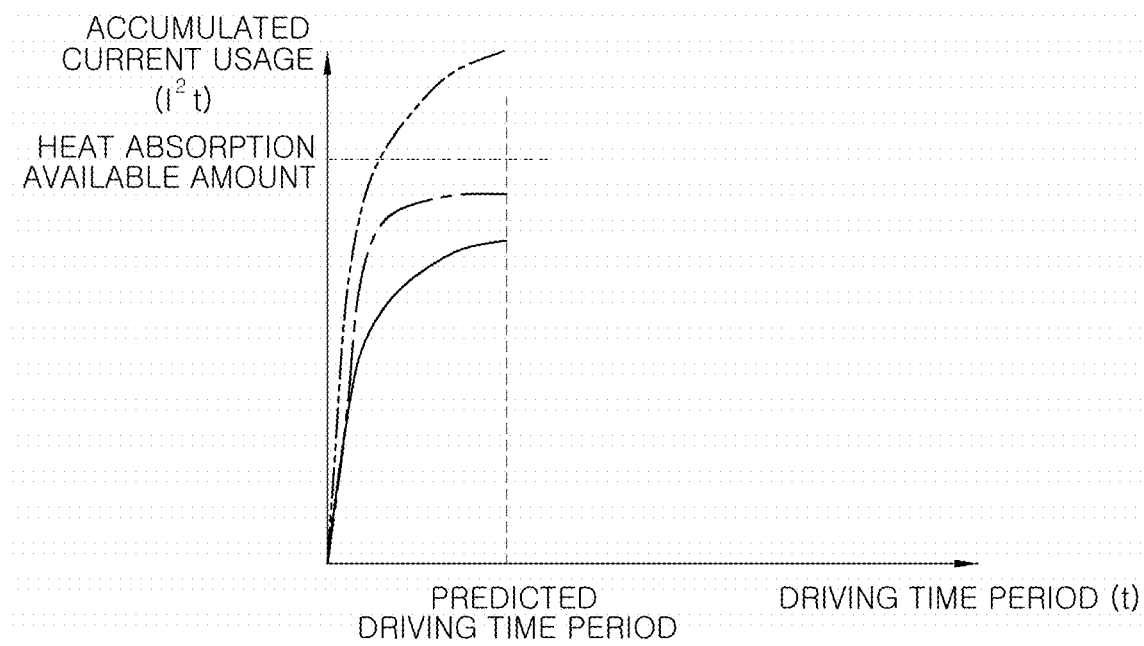
FIGS. 3A and 3B are graphs showing driving characteristics of a driver.
Figure 3B:
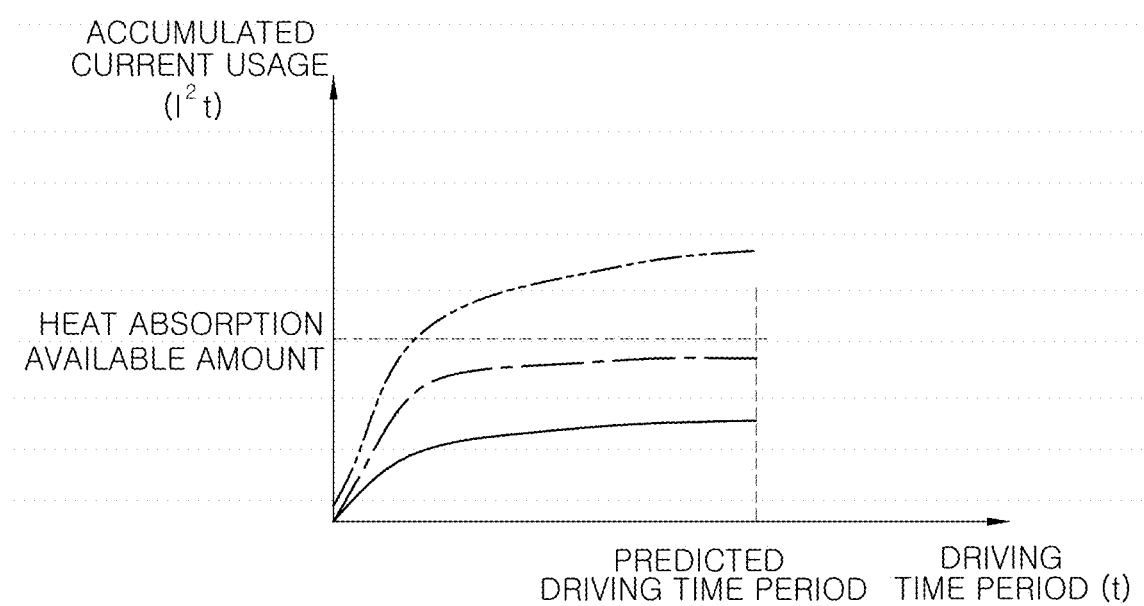
Figure 4:
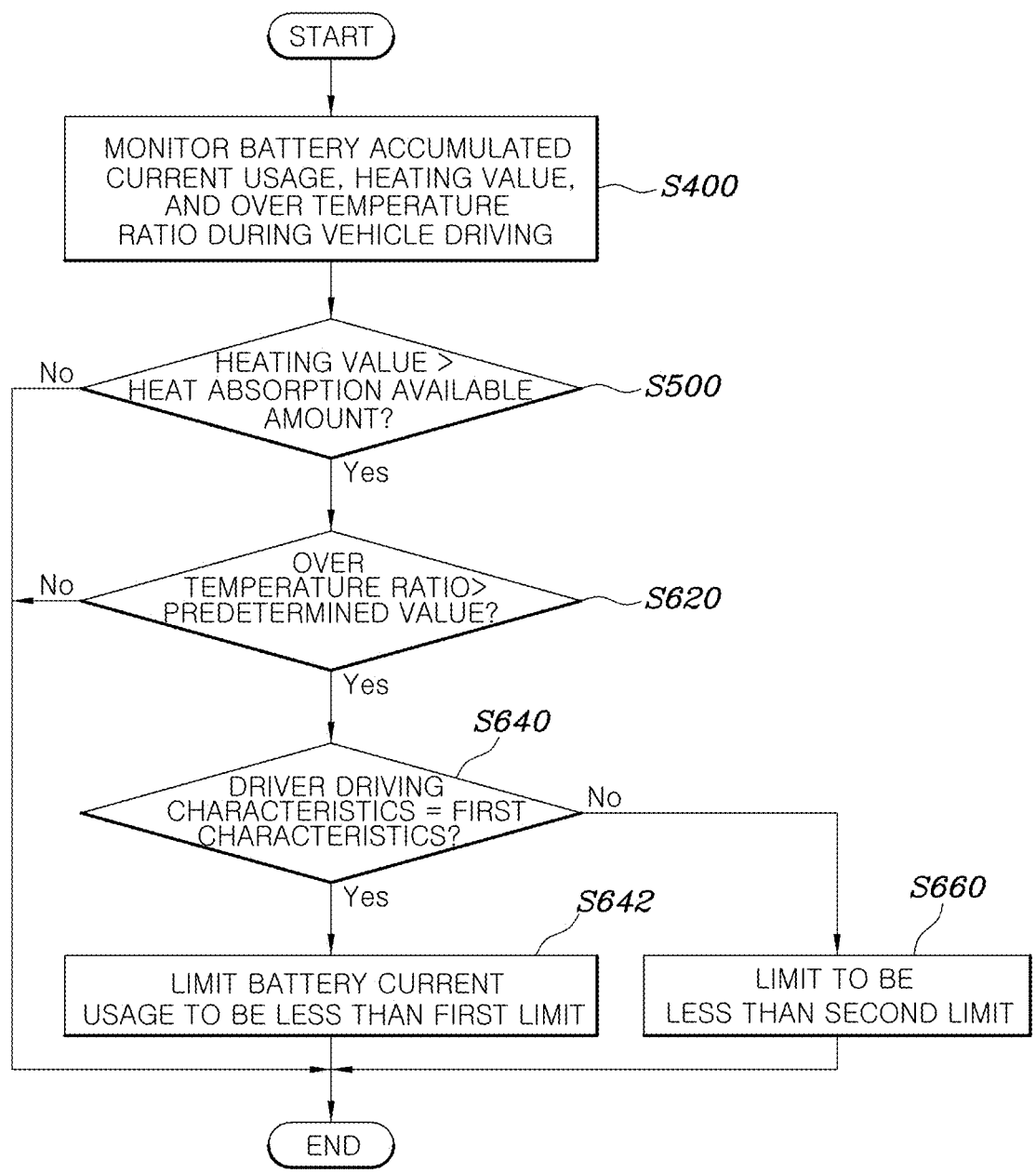
FIG. 4 is a flowchart 2 of a method of controlling a vehicular battery cooling system according to an embodiment of the present disclosure.

FIG. 1 is a diagram showing a configuration of a vehicular battery cooling system according to an embodiment of the present disclosure. FIG. 2 is a flowchart 1 of a method of controlling a vehicular battery cooling system according to an embodiment of the present disclosure. FIGS. 3A and 3B are graphs showing driving characteristics of a driver. FIG. 4 is a flowchart 2 of a method of controlling a vehicular battery cooling system according to an embodiment of the present disclosure.

First, referring to FIG. 1, the vehicular battery cooling system according to an embodiment of the present disclosure may include, a plurality of stacked battery cells 100, a heat absorption member 200 disposed between terminals of the battery cells 100, a navigation device 300 configured to receive a destination from a user to derive a driving time period, and a controller 500 configured to derive a battery heating value from the derived driving time period and to limit a battery current usage based on a comparison result between the derived battery heating value and a pre-stored heat absorption available amount of the heat absorption member 200 when a destination is input to the navigation device 300 prior to vehicle driving.

The plurality of battery cells 100 may be stacked and the heat absorption member 200 may be disposed between terminals and may be foiled of a material selected from various known materials. A lead tab portion of the battery cells 100 intensively generates heat and, in this regard, the heat absorption member 200 may be disposed between terminals to effectively absorb the generated heat of the battery cells 100.

In addition, the heat absorption member 200 may be applied and, accordingly, differently from a cooling method using a cooling fan, a proposed cooling system does not include a cooling fan, a cooling inlet duct, and a cooling outlet duct, thereby reducing manufacturing costs due to miniaturization of the cooling system and volume reduction of the system and reducing the number of assembly steps due to removal of in-line components. In addition, due to removal of a cooling fan, noise of the cooling fan and switching noise of switching current may not be introduced indoors and rear-seat productivity and luggage productivity may be enhanced.

The navigation device 300 may derive a driving time period upon receiving a destination from a user.

When the destination is input to the navigation device 300 prior to vehicle driving, the controller 500 may derive a battery heating value from the derived driving time period, limit a battery current usage based on a comparison result between the derived battery heating value and a pre-stored heat absorption available amount of the heat absorption member 200, monitor a battery accumulated current usage, a heating value, and an over temperature ratio during vehicle driving, and limit the battery current usage based on a comparison result between the monitored battery heating value and a pre-stored heat absorption available amount of the heat absorption member. A detailed control procedure of the controller 500 is described below through a method of controlling a vehicular battery cooling system.

Referring to FIG. 2, the method of controlling a vehicular battery cooling system according to an embodiment of the present disclosure may include determining whether a destination is input to a navigation device from a user prior to vehicle driving (S100), upon receiving the destination, deriving a battery heating value from a driving time period that is derived via input of the destination (S200), and limiting a battery current usage based on a comparison result between the derived battery heating value and a pre-stored heat absorption available amount of the heat absorption member.

The method of controlling the controller 500 is now described in terms of limitation of the battery current usage prior to vehicle driving and, that is, first, whether the destination is input to a navigation device from a user prior to vehicle driving may be determined (S100) and, when the destination is input to the navigation device, a battery heating value may be derived from the driving time period derived through the navigation device (S200). In this case, the heating value may be derived in consideration of whether a downtown, a mountainous area, an express way, and the like are contained in a traveling path to the destination.

In the deriving of the battery heating value (S200), the battery heating value may be derived via a product of the driving time period and square of driving current as driving current usage. When a destination is not input to the navigation device, the battery heating value may be derived based on driving data such as a traveling distance and a driving time period, and the accumulated current usage depending on a driving time period, which are pre-stored in a vehicle (S120).

When the battery heating value is derived, the derived battery heating value and the pre-stored heat absorption available amount of the heat absorption member may be compared (S320). As the comparison result, when the derived battery heating value is less than the pre-stored heat absorption available amount of the heat absorption member, a battery may be sufficiently cooled by the heat absorption member and, thus, the battery current usage may not be limited.

On the other hand, when the derived battery heating value is greater than the pre-stored heat absorption available amount of the heat absorption member, it may be difficult to cool a battery using only the heat absorption member and, thus, battery current usage may be limited based on an over temperature ratio to additionally cool the battery.

In detail, first, when the derived battery heating value is greater than the pre-stored heat absorption available amount of the heat absorption member, the battery over temperature ratio based on a heat absorption excess may be derived (S340).

Here, the battery over temperature ratio may refer to a ratio of an over temperature exposure time period to the driving time period. In detail, referring to FIGS. 3A and 3B, the battery over temperature is predicted in a section in which the accumulated current usage (which is an index for deriving a heating value) is greater than the heat absorption available amount and the over temperature ratio may refer to a ratio of the over temperature exposure time period to the driving time period.

When the battery over temperature ratio is derived, whether the derived battery over temperature ratio is greater than a predetermined value may be determined (S350). Here, the predetermined value may be applied in various ways according to settings.

When the derived battery over temperature ratio is greater than the predetermined value, pre-stored driving characteristics of a driver may be determined (S370). FIG. 3A is a graph showing high-power and short-time or high-power and long-time driving characteristics that are first characteristics of the driving characteristics of the driver. FIG. 3B is a graph showing low-power short-time driving characteristics that are second characteristics of the driving characteristics of the driver. Driving characteristics data (temperature rise gradient and over temperature ratio degree) based on driving of a driver for a predetermined time period shown in FIGS. 3A and 3B may be stored in a vehicle.

When the pre-stored driving characteristics of the driver is the first characteristics, a battery current usage per hour may be limited to be less than a first limit (S372) and when the pre-stored driving characteristics of the driver is the second characteristics, the battery current usage per hour may be limited to be less than a second limit (S380). Here, the first limit and the second limit may be values that are applied in various ways according to settings.

In a method of controlling a vehicular battery cooling system according to an embodiment of the present disclosure, actual road driving data such as a driving time period, a traveling distance, and a downtown, a mountainous area, and an express way on a driving path, which are derived via input of the destination to a navigation device may be actively used to intelligently control a current usage.

Referring to FIG. 4, the method of controlling the vehicular battery cooling system according to an embodiment of the present disclosure may include monitoring the battery accumulated current usage, the heating value, and the over temperature ratio during vehicle driving (S400) and limiting the battery current usage based on a comparison result between the monitored battery heating value and the pre-stored heat absorption available amount of the heat absorption member.

The method of controlling the controller 500 is now described in terms of limitation of the battery current usage during vehicle driving and, that is, first, the battery accumulated current usage, the heating value, and the over temperature ratio may be monitored during vehicle driving (S400). Here, the battery accumulated current usage, the heating value, and the over temperature ratio may be a derived via data accumulation during actual driving differently from the values derived prior to vehicle driving.

The monitored battery heating value and the pre-stored heat absorption available amount of the heat absorption member may be compared (S500) and, when the monitored battery heating value is greater than the pre-stored heat absorption available amount of the heat absorption member, the monitored battery over temperature ratio may be compared with a predetermined value (S620). Here, the predetermined value may be applied in various ways according to settings.

As the comparison result, when the battery over temperature ratio is greater than the predetermined value, pre-stored driving characteristics of the driver may be determined (S640) and, as the determination result, when the pre-stored driving characteristics of the driver is the first characteristics, a battery current usage per hour may be limited to be less than a first limit (S642) and when the pre-stored driving characteristics of the driver is the second characteristics, the battery current usage per hour may be limited to be less than a second limit (S660), like in the aforementioned limitation of the battery current usage prior to vehicle driving. Here, the first limit and the second limit may be values that are applied in various ways according to settings.

As described above, the vehicular battery cooling system and the method of controlling the same according to various embodiments of the present disclosure may intelligently control a current usage using a heat absorption member of a battery terminal and driving data on an actual road.

A conventional cooling fan and cooling inlet/outlet duct may be removed, thereby reducing manufacturing costs due to miniaturization of the cooling system and volume reduction of the system and reducing the number of assembly steps due to removal of in-line components.

Due to removal of a cooling fan, noise of the cooling fan and switching noise of switching current may not be introduced indoors and rear-seat productivity and luggage productivity may be enhanced.

By virtue of the configuration of the heat absorption member, when thermal runaway occurs, event occurrence may be delayed, thereby enhancing stability.

A dead space may be removed between cells and between modules and a heat dissipation member may not be configured between cells, thereby increasing packing density.

In addition, a pack structure may be lightweight due to removal of a heat dissipation member.

Although the present disclosure has been shown and described with respect to specific embodiments, it will be apparent to those having ordinary skill in the art that the present disclosure may be variously modified and altered without departing from the spirit and scope of the present disclosure as defined by the following claims.

What is claimed is:

1. A method of controlling a vehicular battery cooling system comprising a heat absorption member disposed between terminals of a plurality of stacked battery cells, the method comprising:
   determining whether a destination is input to a navigation device from a user prior to vehicle driving;
   when the destination is input, deriving a battery heating value from a driving time period derived via input of the destination; and
   limiting a battery current usage based on a comparison result between the derived battery heating value and a pre-stored heat absorption available amount of the heat absorption member.

2. The method of claim 1, wherein the determining of whether the destination is input includes deriving a battery heating value based on an accumulated current usage depending on a pre-stored driving time period of a user when the destination is not input.

3. The method of claim 1, wherein the limiting of the battery current usage includes:
   when the derived battery heating value is greater than the pre-stored heat absorption available amount of the heat absorption member, deriving a battery over temperature ratio based on a heat absorption excess; and
   when the derived battery over temperature ratio is greater than a predetermined value, limiting a battery current usage based on pre-stored driving characteristics of a driver.

4. The method of claim 3, wherein the limiting of the battery current usage based on the pre-stored driving characteristics of the driver includes limiting the battery current usage to be less than a first limit when the pre-stored driving characteristics of the driver are first characteristics and limiting the battery current usage to be less than a second limit when the pre-stored driving characteristics of the driver are second characteristics.

5. A method of controlling a vehicular battery cooling system comprising a heat absorption member disposed between terminals of a plurality of stacked battery cells, the method comprising:
   monitoring a battery accumulated current usage, a heating value, and an over temperature ratio during vehicle driving; and
   limiting a battery current usage based on a comparison result between the monitored battery heating value and a pre-stored heat absorption available amount of the heat absorption member.

6. The method of claim 5, wherein the limiting of the battery current usage includes:
   when the monitored battery heating value is greater than the pre-stored heat absorption available amount of the heat absorption member, comparing the monitored battery over temperature ratio with a predetermined value; and
   as a comparison result, when the battery over temperature ratio is greater than the predetermined value, limiting the battery current usage based on pre-stored driving characteristics of a driver.

7. The method of claim 6, wherein the limiting of the battery current usage based on the pre-stored driving characteristics of the driver includes limiting the battery current usage to be less than a first limit when the pre-stored driving characteristics of the driver is first characteristics and limiting the battery current usage to be less than a second limit when the pre-stored driving characteristics of the driver is second characteristics.

8. A vehicular battery cooling system comprising:
   a plurality of stacked battery cells;
   a heat absorption member disposed between terminals of the battery cells;
   a navigation device configured to receive a destination from a user to derive a driving time period; and
   a controller configured to derive a battery heating value from the derived driving time period and to limit a battery current usage based on a comparison result between the derived battery heating value and a pre-stored heat absorption available amount of the heat absorption member when a destination is input to the navigation device prior to vehicle driving.

9. The vehicular battery cooling system of claim 8, wherein the controller derives a battery over temperature ratio based on a heat absorption excess when the derived battery heating value is greater than the pre-stored heat absorption available amount of the heat absorption member and limits the battery current usage based on pre-stored driving characteristics of a driver when the derived battery over temperature ratio is greater than a predetermined value.

10. The vehicular battery cooling system of claim 8, wherein the controller is configured to monitor a battery accumulated current usage, a heating value, and an over temperature ratio during vehicle driving and to limit the battery current usage based on a comparison result between the monitored battery heating value and a pre-stored heat absorption available amount of the heat absorption member.

11. The vehicular battery cooling system of claim 10, wherein the controller compares the monitored battery over temperature ratio with a predetermined value when the monitored battery heating value is greater than the pre-stored heat absorption available amount of the heat absorption member and limits the battery current usage based on pre-stored driving characteristics of the driver when the battery over temperature ratio is greater than the predetermined value as a comparison result.

* * * * *